(12) United States Patent
Jun

(10) Patent No.: US 9,133,752 B2
(45) Date of Patent: Sep. 15, 2015

(54) METHOD AND APPARATUS FOR CONTROLLING UREA INJECTION AMOUNT OF VEHICLE

(71) Applicants: Hyundai Motor Company, Seoul (KR); Kia Motors Corporation, Seoul (KR)

(72) Inventor: Daesu Jun, Whasung-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/088,945

(22) Filed: Nov. 25, 2013

(65) Prior Publication Data

US 2014/0182270 A1      Jul. 3, 2014

(30) Foreign Application Priority Data

Dec. 31, 2012   (KR) .................. 10-2012-0158620

(51) Int. Cl.

| | | |
|---|---|---|
| *F01N 3/00* | (2006.01) | |
| *F01N 9/00* | (2006.01) | |
| *F01N 3/20* | (2006.01) | |
| *F01N 3/035* | (2006.01) | |
| *F01N 3/022* | (2006.01) | |

(52) U.S. Cl.
CPC *F01N 9/00* (2013.01); *F01N 3/035* (2013.01); *F01N 3/208* (2013.01); *F01N 9/002* (2013.01);
(Continued)

(58) Field of Classification Search
CPC ....... F01N 3/206; F01N 3/2066; F01N 3/208; F01N 3/0871; F01N 3/2821; F01N 3/023; F01N 3/0233; F01N 3/038; F01N 3/025; F01N 3/0253; F01N 2610/02; F01N 2610/08; F01N 2610/10; F01N 2610/1406; F01N 2610/1433; F01N 2610/1453; F01N 2330/34; F01N 2330/36; F01N 2330/38; F01N 2430/02; F01N 2430/06; F01N 2430/10; F01N 9/00; F01N 9/002; F01N 9/005; F01N 9/007; F01N 11/00; F01N 2430/08
USPC ............ 60/274, 286, 295, 297, 301, 303, 311
See application file for complete search history.

(56) References Cited

U.S. PATENT DOCUMENTS 6,829,890 B2 * 12/2004 Gui et al. ......................... 60/295
6,928,809 B2 *  8/2005 Inoue et al. ..................... 60/297
(Continued)

FOREIGN PATENT DOCUMENTS

DE   10 2005 048 117 A1    4/2007
JP        2009-264181 A    11/2009
(Continued)

*Primary Examiner* — Binh Q Tran
(74) *Attorney, Agent, or Firm* — Morgan, Lewis & Bockius LLP

(57) ABSTRACT

An apparatus and method for controlling a urea injection amount of a vehicle provides precision improvement of urea injection by determining a urea injection amount according to a collection amount of soot that is collected at an SCR integral diesel particulate filter and an accumulation amount of ash. The method includes: detecting a collection amount of soot that is collected at the SCR integral diesel particulate filter and calculating an effective volume of the SCR integral diesel particulate filter according to enlargement of an accumulation amount of ash; calculating an NH3 target storage amount by reflecting the soot collection amount and an effective volume decrement according to ash accumulation; and providing urea injection by determining an NH3 storage control amount and determining a urea necessary injection amount according to the NH3 target storage amount.

4 Claims, 3 Drawing Sheets

(52) U.S. Cl.
CPC .......... *F01N 3/0222* (2013.01); *F01N 2550/02* (2013.01); *F01N 2560/08* (2013.01); *F01N 2570/18* (2013.01); *F01N 2900/08* (2013.01); *F01N 2900/102* (2013.01); *F01N 2900/1411* (2013.01); *F01N 2900/1602* (2013.01); *F01N 2900/1606* (2013.01); *F01N 2900/1611* (2013.01); *F01N 2900/1622* (2013.01); *Y02T 10/24* (2013.01); *Y02T 10/47* (2013.01)

(56) References Cited

U.S. PATENT DOCUMENTS

| | | | |
|---|---|---|---|
| 7,474,953 B2 * | 1/2009 | Hulser et al. | 701/108 |
| 8,577,541 B2 * | 11/2013 | Nevin et al. | 701/29.4 |
| 8,776,495 B2 * | 7/2014 | Gonze et al. | 60/284 |
| 2008/0202107 A1 * | 8/2008 | Boorse et al. | 60/301 |
| 2008/0216467 A1 | 9/2008 | Bruck | |
| 2011/0047986 A1 | 3/2011 | Drasner, III et al. | |
| 2012/0000187 A1 * | 1/2012 | Mullins et al. | 60/277 |

FOREIGN PATENT DOCUMENTS

| | | |
|---|---|---|
| KR | 10-0857346 B1 | 9/2008 |
| KR | 10-2010-0054528 A | 5/2010 |
| KR | 10-2012-0018999 A | 3/2012 |

* cited by examiner

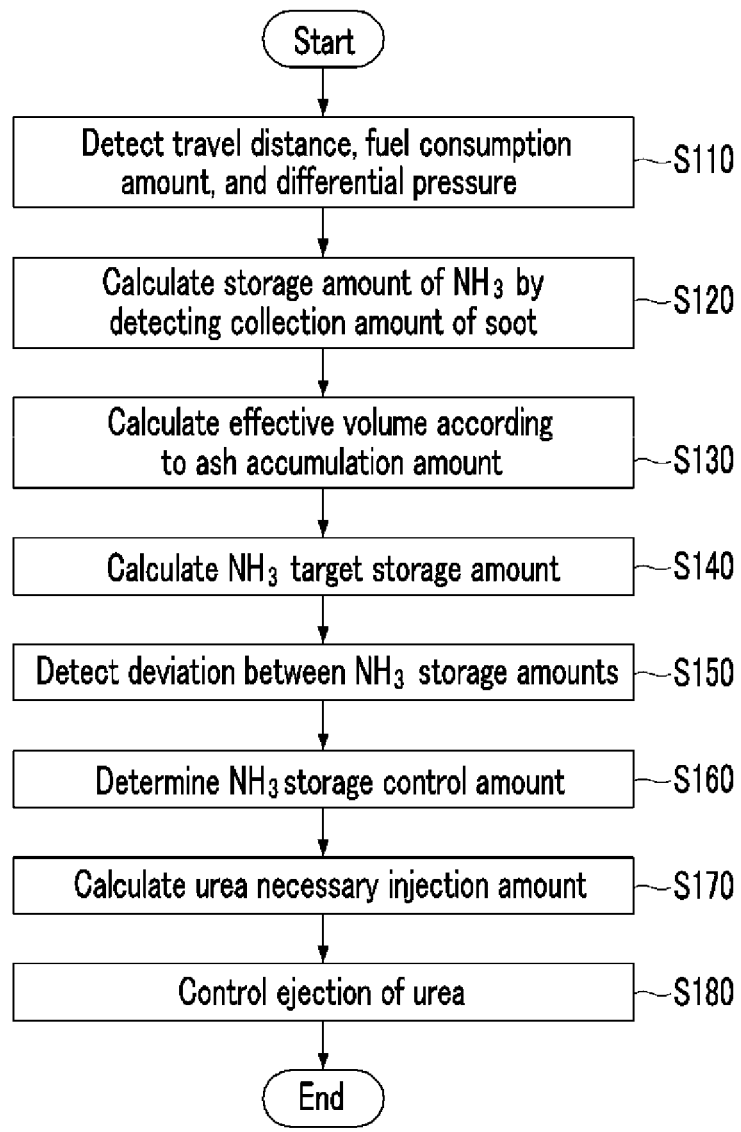

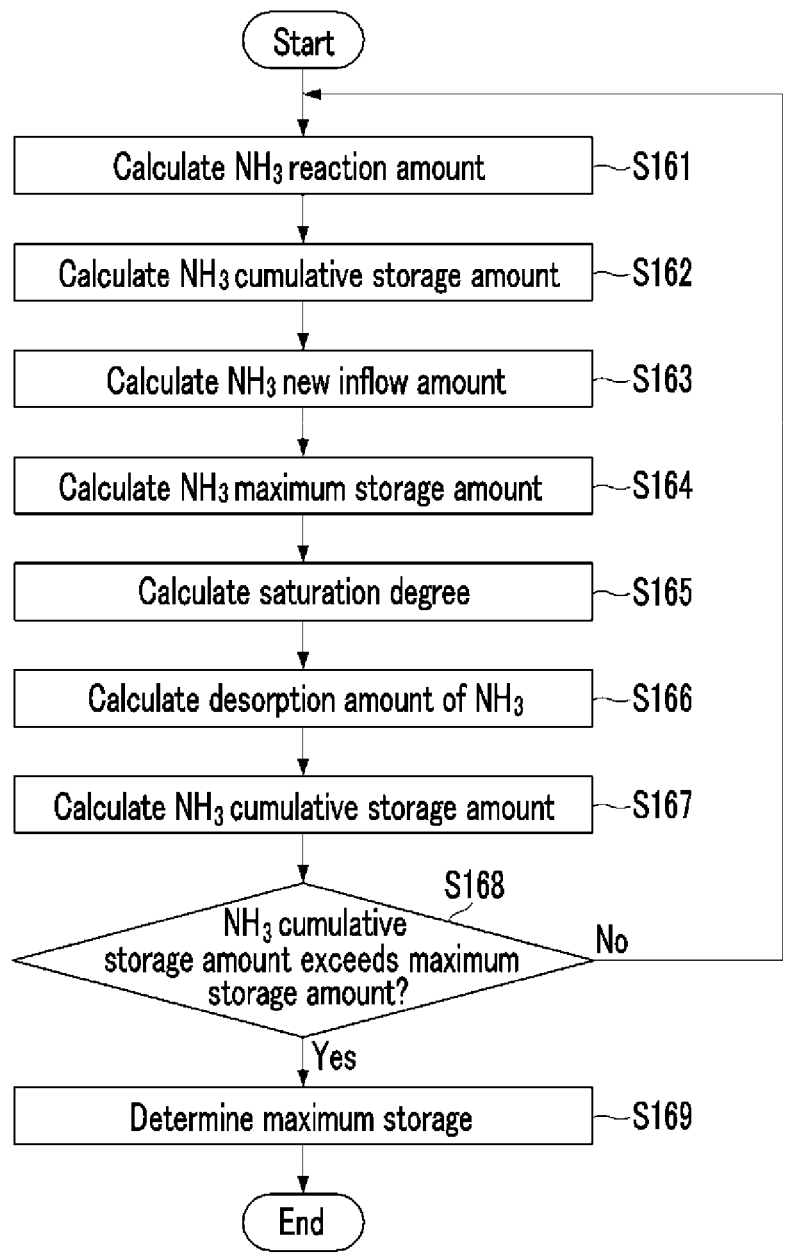

METHOD AND APPARATUS FOR CONTROLLING UREA INJECTION AMOUNT OF VEHICLE

CROSS-REFERENCE TO RELATED APPLICATION

The present application claims priority of Korean Patent Application Number 10-2012-0158620 filed Dec. 31, 2012, the entire contents of which application is incorporated herein for all purposes by this reference.

BACKGROUND OF INVENTION

1. Field of Invention

The present invention relates to an apparatus and method for controlling a urea injection amount of a vehicle that determines a urea injection amount according to a collection amount of soot that is collected at an SCR integral diesel particulate filter and an accumulation amount of ash.

2. Description of Related Art

In a vehicle, in a system in which an SCR catalyst and a diesel particulate filter (DPF) are separated, in a method of determining a urea injection amount, a necessary amount of $NH_3$ is calculated according to a stoichiometric ratio ($NH_3$/NOx), which is a ratio of $NH_3$ and an amount of NOx that are exhausted from an engine.

As another method, a method of calculating a necessary amount of $NH_3$ by subtracting a consumption amount of $NH_3$ from a storage amount of $NH_3$ on an SCR catalyst may be applied.

A system in which the SCR catalyst and the diesel particulate filter are separately formed determines a storage amount of $NH_3$ by reflecting a temperature of the SCR catalyst, an exhaust flow velocity, a catalyst aging degree, and an HC adsorption amount.

In order to provide cost reduction, weight reduction, and efficient package of an aftertreatment device, an SCR integral diesel particulate filter that coats the inside of the diesel particulate filter with an SCR catalyst is applied.

In the SCR integral diesel particulate filter, because an SCR carrier and canning are removed, a weight is reduced, and thus fuel consumption is enhanced.

Because the SCR integral diesel particulate filter may be moved and mounted at the upstream side of an exhaust pipe, a NOx purification performance can be improved due to rise of an exhaust gas temperature.

However, in the SCR integral diesel particulate filter, as a collection amount of soot enlarges, a contact area of an exhaust gas and an SCR catalyst decreases and thus a storage amount of $NH_3$ reduces.

As a travel distance of a vehicle enlarges, an accumulation amount of ash increases and thus an effective volume of the SCR integral diesel particulate filter reduces, thereby reducing a storage amount of $NH_3$.

Therefore, when applying a general $NH_3$ reaction rate model to the SCR integral diesel particulate filter, as a collection amount of soot and an accumulation amount of ash enlarge, control precision of a storage amount of $NH_3$ is deteriorated and thus slip of $NH_3$ may occur.

Exemplars of known methods are Korean Patent No. 10-0857346 (Sep. 1, 2008) and Korean Patent Laid-Open Publication No. 10-2012-0018999 (Mar. 6, 2012).

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an apparatus and method for controlling a urea injection amount of a vehicle having advantages of improving precision when ejecting urea by determining an urea injection amount according to a collection amount of soot that is collected at an SCR integral diesel particulate filter and an accumulation amount of ash.

Various aspects of the present invention provide for a urea injection amount control apparatus of a vehicle including: an SCR integral diesel particulate filter that purifies NOx and that collects a particulate material including soot and ash; a dosing module that ejects urea to the front end of the SCR integral diesel particulate filter; and a control unit that controls urea ejection, wherein the control unit detects a collection amount of soot that is collected at the SCR integral diesel particulate filter from information of a differential pressure sensor, calculates an effective volume of the SCR integral diesel particulate filter according to enlargement of an accumulation amount of ash, and determines an urea necessary injection amount by calculating a target storage amount of $NH_3$ by reflecting an effective volume decrement according to ash accumulation and the soot collection amount.

The control unit may calculate an ash accumulation amount by applying a vehicle travel distance, a fuel consumption amount, and a difference pressure between the front end and the rear end after reproduction of the SCR integral diesel particulate filter is terminated and extract an effective volume according to the ash accumulation amount.

The control unit may calculate a target storage amount of $NH_3$ by applying a collection amount of soot that is collected at the SCR integral diesel particulate filter, an effective volume according to accumulation of ash, an SCR catalyst temperature, an exhaust flow velocity, a catalyst aging degree, and an HC adsorption amount.

The control unit may calculate a maximum storage amount of $NH_3$ by applying a collection amount of soot that is collected at the SCR integral diesel particulate filter, an effective volume according to accumulation of ash, an SCR catalyst temperature, an exhaust flow velocity, and a catalyst aging degree, and determine a storage control amount of $NH_3$ and determine a urea necessary injection amount by detecting a deviation between the target storage amount of $NH_3$ and the maximum storage amount of $NH_3$.

The control unit may calculate an $NH_3$ reaction amount by applying an $NH_3$ consumption amount, an $NH_3$ cumulative storage amount, and a reaction rate of $NH_3$ and $O_2$ in the SCR integral diesel particulate filter, calculate an $NH_3$ cumulative storage amount that is accumulated at the SCR integral diesel particulate filter by applying the $NH_3$ cumulative storage amount and the $NH_3$ reaction amount, and calculate a saturation degree of $NH_3$ with a maximum storage amount against the $NH_3$ cumulative storage amount.

The control unit may calculate a desorption amount of $NH_3$ by applying an $NH_3$ cumulative storage amount, a catalyst temperature, an exhaust flow velocity, and a saturation degree of the SCR integral diesel particulate filter.

The control unit may calculate an $NH_3$ cumulative storage amount that is finally accumulated at the SCR integral diesel particulate filter by applying an $NH_3$ cumulative storage amount, an $NH_3$ new inflow amount, and an $NH_3$ desorption amount and determine that an $NH_3$ storage amount is maintained to the maximum in the SCR integral diesel particulate filter, if the $NH_3$ cumulative storage amount exceeds a maximum storage amount.

Various aspects of the present invention provide for a method of controlling a urea injection amount of a vehicle in which an SCR integral diesel particulate filter is mounted, the method including: detecting a collection amount of soot that is collected at the SCR integral diesel particulate filter and calculating an effective volume of the SCR integral diesel particulate filter according to enlargement of an accumulation amount of ash; calculating an $NH_3$ target storage amount by reflecting the soot collection amount and an effective volume decrement according to ash accumulation; and providing urea injection by determining an $NH_3$ storage control amount and a urea necessary injection amount according to the $NH_3$ target storage amount.

An $NH_3$ target storage amount that determines the urea injection amount may be calculated by applying a soot collection amount that is collected at the SCR integral diesel particulate filter and an effective volume according to ash accumulation, a catalyst temperature, an exhaust flow velocity, a catalyst aging degree, and an HC adsorption amount.

The $NH_3$ storage control amount may be calculated from a deviation between an $NH_3$ target storage amount and an $NH_3$ maximum storage amount.

The $NH_3$ maximum storage amount may be calculated by applying a soot collection amount that is collected at the SCR integral diesel particulate filter, an effective volume according to accumulation of ash, a SCR catalyst temperature, an exhaust flow velocity, and a catalyst aging degree.

The $NH_3$ storage control amount may include calculating an $NH_3$ reaction amount by applying an $NH_3$ consumption amount in the SCR integral diesel particulate filter, an $NH_3$ cumulative storage amount, and a reaction rate of $NH_3$ and $O_2$; calculating an $NH_3$ cumulative storage amount that is accumulated at the SCR integral diesel particulate filter by applying the $NH_3$ cumulative storage amount and the $NH_3$ reaction amount; calculating a saturation degree of $NH_3$ with a maximum storage amount $NH_3$ against the $NH_3$ cumulative storage amount; calculating an $NH_3$ desorption amount by applying the $NH_3$ cumulative storage amount, a catalyst temperature, an exhaust flow velocity, and a saturation degree of the SCR integral diesel particulate filter; calculating an $NH_3$ cumulative storage amount that is finally accumulated at the SCR integral diesel particulate filter by applying the $NH_3$ cumulative storage amount, an $NH_3$ new inflow amount, and an $NH_3$ desorption amount; and determining, if the $NH_3$ cumulative storage amount exceeds the maximum storage amount, that an $NH_3$ storage amount is maintained to the maximum in the SCR integral diesel particulate filter.

In this way, in the present invention, by applying an SCR integral diesel particulate filter, a cost is reduced, a weight decreases, and fuel consumption decreases, and by determining an urea injection amount to which a collection amount of soot and an accumulation amount of ash are applied, urea can be more precisely ejected and thus an exhaust gas is stabilized.

Further, by precisely controlling urea ejection, slip of $NH_3$ is prevented and a commercial value can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a flowchart illustrating an exemplary control procedure of a urea injection amount of a vehicle according to the present invention.

FIG. 3 is a flowchart illustrating a calculation procedure of a storage control amount of $NH_3$ in FIG. 2.

DETAILED DESCRIPTION

Figure 1:
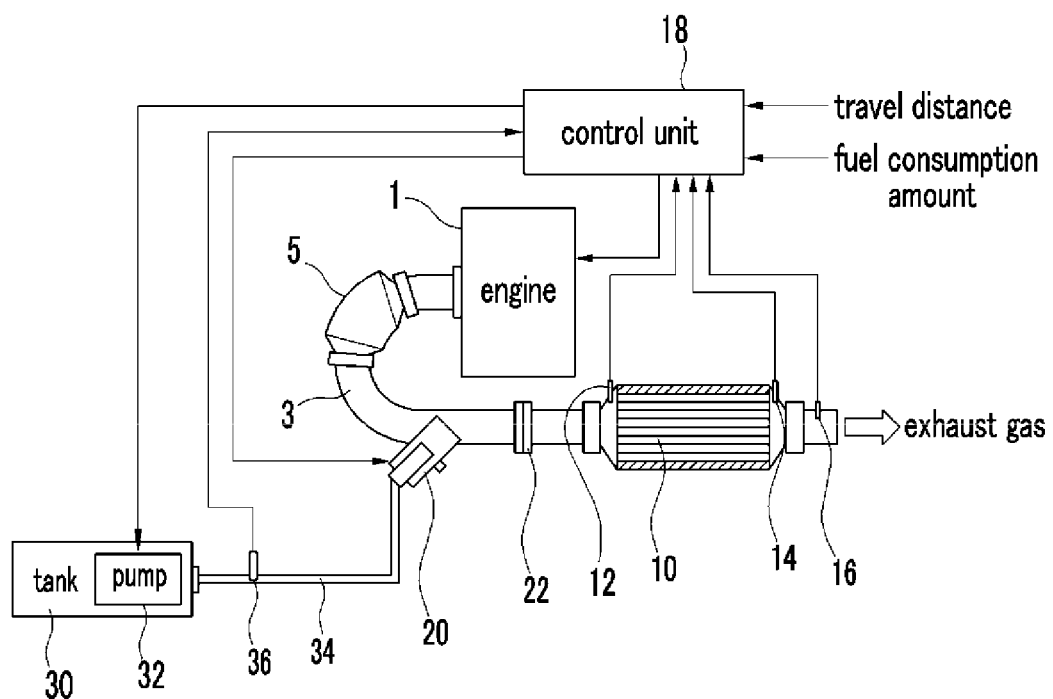
FIG. 1 is a diagram illustrating an exemplary urea injection amount control apparatus of a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto.

FIG. 1 is a diagram illustrating a urea injection amount control apparatus of a vehicle according to various embodiments of the present invention.

Referring to FIG. 1, the urea injection amount control apparatus of a vehicle according to various embodiments of the present invention includes an engine 1, an exhaust pipe 3, a diesel oxidation catalyst 5, an SCR integral diesel particulate filter 10, a first differential pressure sensor 12, a second differential pressure sensor 14, a temperature sensor 16, a control unit 18, a dosing module 20, a mixer 22, a urea tank 30, a pump 32, a urea supply line 34, and a pressure sensor 36.

The diesel oxidation catalyst 5 is mounted adjacent to the engine 1 to purify NOx that is included in an exhaust gas through an oxidation reaction.

The SCR integral diesel particulate filter 10 is formed by coating the inside of a general diesel particulate filter with a material such as $V_2O_5/TiO_2$, $Pt/Al_2O_3$, or zeolite, purifies NOx by a reduction reaction of ammonia and NOx that are acquired from urea that is ejected from the dosing module 20, and prevents a particulate material from being exhausted by collecting PM including soot and ash.

The first differential pressure sensor 12 detects a pressure of an exhaust gas that is input to the SCR integral diesel particulate filter 10 and provides the detected pressure to the control unit 18.

The second differential pressure sensor 14 detects a pressure of an exhaust gas that is exhausted from the SCR integral diesel particulate filter 10 and provides the detected pressure to the control unit 18.

The temperature sensor 16 detects a temperature of the SCR integral diesel particulate filter 10 that is activated by an exhaust gas and provides the detected temperature to the control unit 18.

The control unit 18 detects a collection amount of soot that is collected at the SCR integral diesel particulate filter 10 from information that is provided in the first differential pressure sensor 12 and the second differential pressure sensor 14 and calculates a storage amount of $NH_3$.

A method of a calculating a soot collection amount of the control unit 18 is well-known technology and uses a differential pressure model and a soot collection amount model.

The soot collection amount model may be formed with a soot exhaust amount model of an engine and a reproduction model of soot.

Further, the control unit 18 calculates an effective volume of the SCR integral diesel particulate filter 10 according to enlargement of an ash accumulation amount occurring according to the increase of a travel distance.

A method of calculating an ash accumulation amount is well-known technology and uses a vehicle travel distance, a fuel consumption amount, and a differential pressure between the front end and the rear end after reproduction of a diesel particulate filter is terminated.

When a storage amount of $NH_3$ according to a collection amount of soot that is collected at the SCR integral diesel particulate filter 10 is calculated and when an effective volume of the SCR integral diesel particulate filter 10 according to enlargement of the ash accumulation amount is calculated, the control unit 18 calculates a target storage amount of $NH_3$ by reflecting an effective volume decrement by enlargement of the ash accumulation amount and the soot collection amount.

In this case, the target storage amount of $NH_3$ is calculated by applying a soot collection amount, an effective volume, an SCR catalyst temperature, an exhaust flow velocity, a catalyst aging degree, and an HC adsorption amount.

Thereafter, the control unit 18 determines an $NH_3$ storage control amount by detecting a deviation between an $NH_3$ target storage amount and an $NH_3$ maximum storage amount and determines a urea necessary injection amount.

In the foregoing description, the $NH_3$ maximum storage amount is calculated by applying a soot collection amount, an effective volume, an SCR catalyst temperature, an exhaust flow velocity, and a catalyst aging degree.

As a collection amount of soot and a decrement of an effective volume by ash accumulation are reflected, when a necessary injection amount of urea is calculated, by ejecting urea through the dosing module 20, the control unit 18 provides an optimal NOx purification performance in a state in which ammonia slip does not occur.

The dosing module 20 ejects by a high pressure a urea amount that is calculated by operation of an injector according to a pulse width modulation (PWM) signal that is applied by the control unit 18.

The mixer 22 is disposed between the dosing module 20 and the SCR integral diesel particulate filter 10 to perform a function of splitting particles by colliding particles of urea that is ejected through the dosing module 20 and thus optimally mixes ammonia that is generated from NOx and urea within an exhaust gas by evenly mixing the exhaust gas and urea particles.

Urea for ejection is housed in the urea tank 30, and a predetermined uniform pressure is formed in the urea supply line 34 by driving the pump 32 that is mounted at the inside.

The pressure sensor 36 detects a pressure that is formed in the urea supply line 34, provides information thereof to the control unit 18 and enables the urea supply line 34 to always maintain a predetermined pressure in a state in which the engine 1 maintaining starting.

Operation of a urea injection amount control apparatus of a vehicle according to the present invention having the foregoing function is performed as follows.

When traveling of a diesel vehicle having the SCR integral diesel particulate filter to which the present invention is applied is started, the control unit 18 detects a travel distance that is provided from an odometer, a fuel consumption amount, and a differential pressure between the front end and the rear end of the SCR integral diesel particulate filter 10 from the first differential pressure sensor 12 and the second differential pressure sensor 14 (S110).

The control unit 18 calculates a storage amount of $NH_3$ by detecting a collection amount of soot that is collected at the SCR integral diesel particulate filter 10 from information that is provided from the first differential pressure sensor 12 and the second differential pressure sensor 14 (S120).

A method of calculating a soot collection amount of the control unit 18 is well-known technology and uses a differential pressure model and a soot collection amount model.

The soot collection amount model is formed with a soot exhaust amount model of an engine and a soot reproduction model.

The control unit 18 calculates an ash accumulation amount by applying a travel distance of a vehicle, a fuel consumption amount, and a differential pressure between the front end and the rear end after reproduction of the SCR integral diesel particulate filter 10 is terminated and calculates an effective volume of the SCR integral diesel particulate filter 10 according to an ash accumulation amount (S130).

The method of calculating an ash accumulation amount is well-known technology and uses a travel distance of a vehicle, a fuel consumption amount, and diesel particulate filter, and a differential pressure between the front end and the rear end after reproduction of the SCR integral diesel particulate filter 10 is terminated.

Thereafter, when a storage amount of $NH_3$ according to a collection amount of soot that is collected at the SCR integral diesel particulate filter 10 is calculated at step S120 and an effective volume of the SCR integral diesel particulate filter 10 according to enlargement of an ash accumulation amount is calculated at step S130, the control unit 18 calculates an $NH_3$ target storage amount by reflecting an effective volume decrement by enlargement of an ash accumulation amount and a soot collection amount (S140).

The target storage amount of $NH_3$ at step S140 is calculated by applying a soot collection amount, an effective volume, an SCR catalyst temperature, an exhaust flow velocity, a catalyst aging degree, and an HC adsorption amount.

Thereafter, the control unit 18 detects a deviation between the $NH_3$ target storage amount and the $NH_3$ maximum storage amount that are calculated at step S140 (S150), determines an $NH_3$ storage control amount (S160), and calculates a urea necessary injection amount according to the $NH_3$ storage control amount (S170).

In the foregoing description, the $NH_3$ maximum storage amount is calculated by applying a soot collection amount, an effective volume, an SCR catalyst temperature, an exhaust flow velocity, and a catalyst aging degree.

The control unit 18 ejects the calculated urea necessary injection amount with a high pressure by controlling an injector of the dosing module 20 with a PWM signal and thus provides an optimal NOx purification performance in a state in which ammonia slip does not occur (S180).

That is, by reflecting a collection amount of soot and a decrement of an effective volume by ash accumulation, when an urea necessary injection amount is calculated, by ejecting urea through the dosing module 20, the control unit 18 provides an optimal NOx purification performance in a state in which ammonia slip does not occur.

FIG. 3 is a flowchart illustrating a calculation procedure of an $NH_3$ storage control amount in FIG. 2.

In order to determine an $NH_3$ storage control amount, by applying an $NH_3$ consumption amount of the SCR integral diesel particulate filter 10, an $NH_3$ cumulative storage amount of the SCR integral diesel particulate filter 10, and a reaction rate of $NH_3$ and $O_2$, the control unit 18 calculates an $NH_3$ reaction amount of the SCR integral diesel particulate filter 10 (S161).

When an $NH_3$ reaction amount is calculated at step S161, by applying the $NH_3$ reaction amount and the $NH_3$ cumulative storage amount of the SCR integral diesel particulate filter 10, the control unit 18 calculates an $NH_3$ cumulative storage amount that is accumulated at the SCR integral diesel particulate filter 10 (S162).

By applying a urea injection amount that is ejected to the dosing module 20, a urea mass fraction within urea, and a molecular weight ratio (urea/$NH_3$), the control unit 18 calculates an $NH_3$ new inflow amount that is injected into the SCR integral diesel particulate filter 10 (S163).

Further, by applying a soot collection amount that is collected at the SCR integral diesel particulate filter 10, an effective volume, an SCR catalyst temperature, an exhaust flow velocity, and an aging degree, the control unit 18 calculates an $NH_3$ maximum storage amount (S164) and calculates a saturation degree of $NH_3$ in the SCR integral diesel particulate filter 10 with a maximum storage amount against an $NH_3$ cumulative storage amount (S165).

By applying the $NH_3$ cumulative storage amount of the SCR integral diesel particulate filter 10 that is calculated at step S162, the catalyst temperature, the exhaust flow velocity, and the saturation degree, the control unit 18 calculates a desorption amount of $NH_3$ (S166).

By applying the $NH_3$ cumulative storage amount that is calculated at S162, the $NH_3$ new inflow amount that is calculated at S163, and the $NH_3$ desorption amount that is calculated at S166, the control unit 18 calculates an $NH_3$ cumulative storage amount that is finally accumulated at the SCR integral diesel particulate filter 10 (S167).

Thereafter, the control unit 18 determines whether the $NH_3$ cumulative storage amount that is calculated at S167 exceeds the maximum storage amount (S168), and if the $NH_3$ cumulative storage amount exceeds the maximum storage amount, the control unit 18 determines that the $NH_3$ storage amount maintains the maximum at the SCR integral diesel particulate filter 10 (S169).

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a urea injection amount of a vehicle in which an SCR integral diesel particulate filter is mounted, the method comprising:
   detecting, by a controller, a collection amount of soot collected at the SCR integral diesel particulate filter and calculating an effective volume of the SCR integral diesel particulate filter according to enlargement of an accumulation amount of ash;
   calculating, by the controller, an $NH_3$ target storage amount by reflecting the soot collection amount and an effective volume decrement according to ash accumulation;
   providing, by the controller, urea injection by determining an $NH_3$ storage control amount and determining a urea necessary injection amount according to the $NH_3$ target storage amount and
   ejecting the determined necessary injection amount, by an injector controlled by the controller,
   wherein the determining the $NH_3$ storage control amount comprises:
      calculating, by the controller, an $NH_3$ reaction amount by applying an $NH_3$ consumption amount in the SCR integral diesel particulate filter, an $NH_3$ cumulative storage amount, and a reaction rate of $NH_3$ and $O_2$;
      calculating, by the controller, an $NH_3$ cumulative storage amount accumulated at the SCR integral diesel particulate filter by applying the $NH_3$ cumulative storage amount and the $NH_3$ reaction amount;
      calculating, by the controller, a saturation degree of $NH_3$ with a maximum storage amount $NH_3$ against the $NH_3$ cumulative storage amount;
      calculating, by the controller, an $NH_3$ desorption amount by applying the $NH_3$ cumulative storage amount, a catalyst temperature, an exhaust flow velocity, and a saturation degree of the SCR integral diesel particulate filter;
      calculating, by the controller, an $NH_3$ cumulative storage amount that is finally accumulated at the SCR integral diesel particulate filter by applying the $NH_3$ cumulative storage amount, an $NH_3$ new inflow amount, and an $NH_3$ desorption amount; and
      determining, by the controller, if the $NH_3$ cumulative storage amount exceeds the maximum storage amount, that an $NH_3$ storage amount is maintained to the maximum in the SCR integral diesel particulate filter.

2. The method of claim 1, wherein the $NH_3$ target storage amount that determines the urea injection amount is calculated by applying a soot collection amount collected at the SCR integral diesel particulate filter and an effective volume according to ash accumulation, a catalyst temperature, an exhaust flow velocity, a catalyst aging degree, and an HC adsorption amount.

3. The method of claim 2, wherein the $NH_3$ maximum storage amount is calculated by applying a soot collection amount collected at the SCR integral diesel particulate filter, an effective volume according to accumulation of ash, an SCR catalyst temperature, an exhaust flow velocity, and a catalyst aging degree.

4. A urea injection amount control apparatus of a vehicle, comprising:
   an SCR integral diesel particulate filter that purifies NOx and that collects a particulate material comprising soot and ash;
   a dosing ejector that ejects urea to a front end of the SCR integral diesel particulate filter; and a controller that controls urea ejection;

wherein the controller operates according to a predetermined program, calculates an $NH_3$ target storage amount, and determines a urea necessary injection amount by reflecting a collection amount of soot collected at the SCR integral diesel particulate filter and an effective volume decrement according to ash accumulation by executing a method comprising:

detecting, by a controller, a collection amount of soot collected at the SCR integral diesel particulate filter and calculating an effective volume of the SCR integral diesel particulate filter according to enlargement of an accumulation amount of ash;

calculating, by the controller, an $NH_3$ target storage amount by reflecting the soot collection amount and an effective volume decrement according to ash accumulation;

providing, by the controller, urea injection by determining an $NH_3$ storage control amount and determining a urea necessary injection amount according to the $NH_3$ target storage amount; and ejecting the determined necessary injection amount, by an injector controlled by the controller, wherein the determining the $NH_3$ storage control amount comprises:

calculating, by the controller, an $NH_3$ reaction amount by applying an $NH_3$ consumption amount in the SCR integral diesel particulate filter, an $NH_3$ cumulative storage amount, and a reaction rate of $NH_3$ and $O_2$;

calculating, by the controller, an $NH_3$ cumulative storage amount accumulated at the SCR integral diesel particulate filter by applying the $NH_3$ cumulative storage amount and the $NH_3$ reaction amount;

calculating, by the controller, a saturation degree of $NH_3$ with a maximum storage amount $NH_3$ against the $NH_3$ cumulative storage amount;

calculating, by the controller, an $NH_3$ desorption amount by applying the $NH_3$ cumulative storage amount, a catalyst temperature, an exhaust flow velocity, and a saturation degree of the SCR integral diesel particulate filter;

calculating, by the controller, an $NH_3$ cumulative storage amount that is finally accumulated at the SCR integral diesel particulate filter by applying the $NH_3$ cumulative storage amount, an $NH_3$ new inflow amount, and an $NH_3$ desorption amount; and determining, by the controller, if the $NH_3$ cumulative storage amount exceeds the maximum storage amount, that an $NH_3$ storage amount is maintained to the maximum in the SCR integral diesel particulate filter.

* * * * *